US010099583B2

(12) United States Patent
Schulze (10) Patent No.: US 10,099,583 B2
(45) Date of Patent: Oct. 16, 2018

(54) METHOD FOR PRODUCING AN ELEMENT HAVING A COVER, AND SUCH AN ELEMENT

(71) Applicant: Johnson Controls GmbH, Burscheid (DE)

(72) Inventor: Uwe Schulze, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 36 days.

(21) Appl. No.: 15/302,273

(22) PCT Filed: Jun. 12, 2015

(86) PCT No.: PCT/EP2015/063181
§ 371 (c)(1),
(2) Date: Oct. 6, 2016

(87) PCT Pub. No.: WO2015/189394
PCT Pub. Date: Dec. 17, 2015

(65) Prior Publication Data
US 2017/0028887 A1 Feb. 2, 2017

(30) Foreign Application Priority Data
Jun. 13, 2014 (DE) .................. 10 2014 211 374

(51) Int. Cl.
*B60N 2/58* (2006.01)
*B29C 65/48* (2006.01)
*B29L 31/58* (2006.01)

(52) U.S. Cl.
CPC ............ *B60N 2/5891* (2013.01); *B29C 65/48* (2013.01); *B60N 2/5816* (2013.01); *B60N 2/5825* (2013.01); *B60N 2/5833* (2013.01); *B60N 2/5866* (2013.01); *B60N 2/5875* (2013.01); *B29L 2031/58* (2013.01)

(58) Field of Classification Search
CPC .. B60N 2/5891; B60N 2/5816; B60N 2/5825; B60N 2/5833; B60N 2/5866; B60N 2/5875; B29C 65/48; B29L 2031/58
See application file for complete search history.

(56) References Cited

U.S. PATENT DOCUMENTS

| | | | |
|---|---|---|---|
| 5,110,649 A * | 5/1992 | Morse | A44B 18/0076 24/444 |
| 5,669,670 A | 9/1997 | Haraguchi et al. | |
| 2008/0309143 A1 | 12/2008 | Booth et al. | |
| 2009/0049719 A1 * | 2/2009 | Compton | G09F 21/02 40/586 |

FOREIGN PATENT DOCUMENTS

| | | |
|---|---|---|
| CN | 15 90 277 A | 3/2005 |
| DE | 19 05 833 U | 12/1964 |

(Continued)

*Primary Examiner* — Philip F Gabler
(74) *Attorney, Agent, or Firm* — McGlew & Tuttle, P.C.

(57) ABSTRACT

A method produces an element (3), in particular a vehicle seat, having a seamless cover (2). The seamless cover (2) is optionally provided with a lamination (1). A molding (1.2) is applied and fastened to a surface side (1.1) of the lamination (1) facing away from the cover (2) or to a surface side (2.2) of the cover (2) that is not visible. The fastened molding (1.2) is connected to the cover (2) by bonding.

16 Claims, 5 Drawing Sheets

(56) References Cited

FOREIGN PATENT DOCUMENTS

| | | |
|---|---:|---:|
| DE | 36 90 243 C2 | 9/1990 |
| DE | 100 59 471 A1 | 7/2001 |
| DE | 101 56 658 C1 | 5/2003 |
| DE | 10 2011 087499 A1 | 6/2013 |
| DE | 10 2012 011 989 A1 | 12/2013 |
| EP | 0 162 400 A1 | 11/1985 |
| FR | 2 816 185 A1 | 5/2002 |
| GB | 2 253 219 A | 9/1992 |
| JP | 57-20257 U | 2/1982 |
| JP | S61-79964 U | 5/1986 |
| JP | S62-14884 A | 1/1987 |
| JP | 2005-000418 A | 1/2005 |

\* cited by examiner

METHOD FOR PRODUCING AN ELEMENT HAVING A COVER, AND SUCH AN ELEMENT

CROSS REFERENCE TO RELATED APPLICATIONS

This application is a United States National Phase Application of International Application PCT/EP2015/063181 filed Jun. 12, 2015 and claims the benefit of priority under 35 U.S.C. § 119 of German Application 10 2014 211 374.1 filed Jun. 13, 2014, the entire contents of which are incorporated herein by reference.

FIELD OF THE INVENTION

The invention relates to a method for producing an element provided with a cover, in particular a vehicle seat element provided with a seat cover. Furthermore, the invention relates to such an element, in particular a vehicle seat.

BACKGROUND OF THE INVENTION

In order to produce an in particular upholstered element, such as a vehicle seat, various methods are known. For example, a back-foaming method for a seat cover is known as a production method from DE 100 59 471 A1, wherein the seat cover is connected firmly to the foam part and is immovable with respect to the foam part.

In a further known method, the cover is sewn onto a carrier of the element, in particular onto a foam body or some other molded part, or is tacked thereto or fastened by means of sewn-on or welded-on feeder rods, wires or clips, as described for example in DE 101 56 658 C1. This can result in bulges in the surface of the cover.

SUMMARY OF THE INVENTION

An object of the present invention to specify a method for producing an element provided with a cover, said method being improved with respect to the prior art. Furthermore, it is the object of the invention to specify an element having an improved contour.

In the method according to the invention for producing an element provided with a seamless cover, a molding (also known as a formation or form element) is secured to a non-visible surface side facing away from the visible surface side of the cover and the secured molding is connected to the cover by a material bond.

In other words, the molding is arranged on the non-visible side of the cover.

Alternatively, in the case of a seamless cover provided with a lining (also known as a lamination), the molding can have been secured to the lining, in particular to a surface side, facing away from the cover, of the lining.

In this case, to form a predetermined, in particular concave and/or convex, outer contour of the element, the molding is introduced into or applied to a surface side of a lining, in order to avoid bulging of the seamless cover.

The molding is secured for example by means of at least one seam. Alternatively, the molding can be tacked on or adhesively bonded. In this case, the molding can be secured directly or indirectly to the lining.

The lining and/or the cover is/are to this end cut to size in a manner corresponding to the element to be covered, for example a seat part or a backrest. Before the molding is secured, the lining is connected to the cover by a material bond, in particular adhesively bonded together under pressure and temperature, in particular low temperatures. Depending on the type of lamination, for example adhesive or flame lamination, the lining can also be molded, back-molded, back-foamed, foamed, fused or adhesively bonded onto the cover.

An element upholstered with such a lining having a secured molding of the lower-web type and with such a cover has a molded and seam-free surface and thus a homogeneous outer contour, formed by the at least one molding, without visible bulges, seams, weld seams or visible fastenings. In this case, in particular the cover has a contour that fits precisely with the profiled, in particular convex and/or concave, outer contour of the lining and thus of the element to be upholstered, in particular the carrier element thereof, without what are referred to as bulges or drum effects.

In one possible embodiment, a tab, pocket or loop (also referred to as a listing pocket) is introduced into or applied to the cover or the lining as the molding. In addition, the molding is secured to a carrier unit, in particular a synthetic molded body of a seat part or of a backrest, on the non-visible surface side of the cover or on that surface of the lining that faces away from the cover, for example by means of a touch-and-close tape or loops and hooks.

In one development, provision is made for the molding to be applied indirectly to the cover or lining. In this case, the molding is first of all secured, for example sewn, adhesively bonded or tacked, to a carrier, in particular a cloth material, a woven fabric, a knit or a warp-knit.

The carrier having the secured molding is then connected to the cover or lining by a material bond, in particular by adhesive bonding, with the molding-free surface side. In this case, the carrier can already have been provided with an adhesive, in particular saturated therewith. Alternatively, an adhesive layer can have been applied to the corresponding surface side of the carrier.

In a further embodiment, a support element, in particular a looped tape, rod, clip or wire, is introduced into a cavity in the molding.

Furthermore, an impression, piece of embroidery, screen print, inkjet print or offset print can be introduced into the cover before it is connected to the lining. In this case, design elements, such as a pattern, decorative stitching, an impression, a screen print or an inkjet print are able to be introduced into the cover, for example by means of corresponding machine tools, in particular a CNC (Computerized Numerical Control) machine, before the cover is connected to the lining. On account of the seam-free configuration of the cover, in particular of a seat cover, such design elements, in particular patterns, decorative stitching, impressions, a screen print or an inkjet print, can be introduced into the cover without misalignment of the design elements, for example of the pattern or decorative stitching. Furthermore, the number of cuttings of the cover and/or of the lining and the number of manual sewing operations can be reduced.

In one possible embodiment, a thermoplastic film, which can be applied to a carrier unit of the element after it has been connected to the cover, can be used as the lining. An alternative lining material, in particular a nonwoven or woven fabric or some other natural/synthetic fibrous nonwoven or a foam, can also be used as the lining. Such a lining supports the shaping of the cover and can additionally act as a stretching brake. Preferably, the lining has a thickness of several millimeters, in particular from 1 millimeter to 10 mm, for example more than 3 millimeters or more, such that it is possible to dispense with additional quilting cotton.

Optionally, a reinforcing element can be applied to that surface side of the lining that faces away from the cover or to the non-visible surface side of the cover. The reinforcing element is in particular a reinforcing fabric, for example a knit, a warp-knit or a nonwoven.

In this embodiment, the carrier provided with the secured molding is applied to the reinforcing element with the surface side that faces away from the molding.

The element according to the invention, in particular a vehicle seat, is provided with a seamless cover without a lining or with a seamless cover arranged on a lining, wherein a molding is secured to a non-visible surface side facing away from the visible surface side of the cover or to a surface side, facing away from the cover, of the lining and the secured molding is introduced into or applied to the non-visible surface side of the cover or introduced into or applied to the surface side, facing away from the cover, of the lining and is connected to the cover by a material bond.

In order to form a concave and/or convex and in particular bulge-free outer contour of the element, the molding is introduced into or applied to the non-visible cover surface side or introduced into or applied to the surface side of the lining and secured for example by way of at least one seam. In this case, the molding can be secured directly or indirectly to the lining on the non-visible surface side of the cover or on the surface side, facing away from the cover, of the lining. Preferably, it is secured indirectly.

To this end, the cut-to-size lining is first of all adhesively bonded or fused to the cover by a material bond, in particular under pressure and/or temperature. Depending on the type of connection by a material bond, for example flame lamination or adhesive lamination, and the type of material, for example nonwoven, warp-knit, film or foam, the cover can be provided with a nonwoven lining, woven fabric lining, film lining or foam lining.

Preferably, as described above, a tab, pocket or loop has been introduced into or applied to the cover or the lining as the molding. Furthermore, a support element, in particular a looped tape, rod, clip or wire, can have been introduced into a cavity in the molding.

In the case of indirect securing, the molding is secured to a carrier and the carrier is connected to the cover or lining by a material bond. For example, the molding is sewn or mechanically connected, for example tacked, or adhesively bonded to the carrier. The carrier of the molding is formed for example from a cloth material, a textile, a woven fabric, a knit or a warp-knit, and allows the molding to be secured easily.

In addition, the molding is secured to the carrier unit in the direction of an upholstery element forming the latter, for example by means of a touch-and-close connection (touch-and-close tape) or a hook-and-eye/loop connection or a tacked connection.

In one development, the lining is formed from a thermoplastic film which has been applied to a carrier unit of the element, in particular of the seat part or backrest. Alternatively, the lining can be formed from a foam, a nonwoven or a synthetic film. In one possible embodiment, the carrier unit is formed from synthetic molded body or a natural molded body or a foam molded body, in particular a polyurethane foam body.

A reinforcing element, in particular a cloth material, woven fabric or nonwoven, is optionally arranged between the lining and the molding or between the cover and the molding.

Exemplary embodiments of the invention are described in more detail with reference to the appended schematic figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
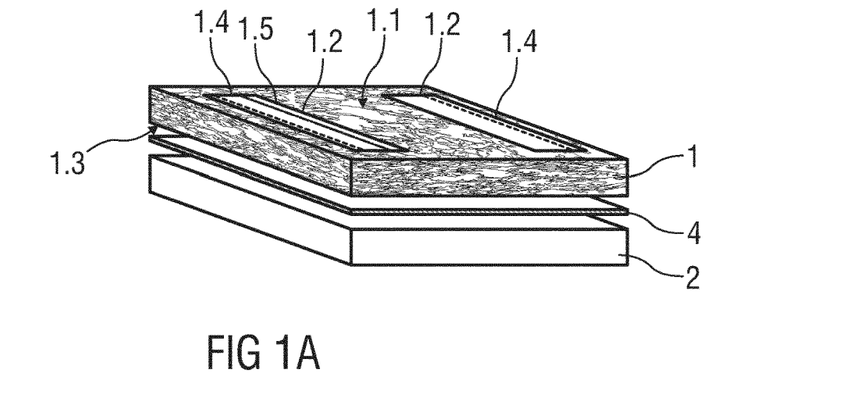
FIG. 1A is a schematic perspective view showing an enlarged detail of one of different exemplary embodiments of a lining and of a cover for an element upholstered in particular in a seam-free manner.
Figure 1B:
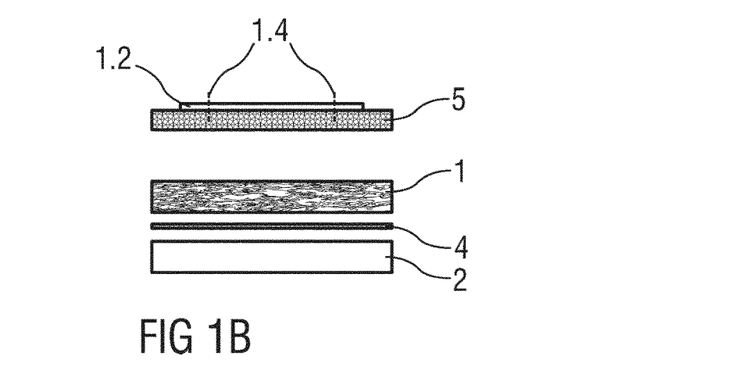
FIG. 1B is a schematic view showing an enlarged detail of another of different exemplary embodiments of a lining and of a cover for an element upholstered in particular in a seam-free manner.
Figure 1C:
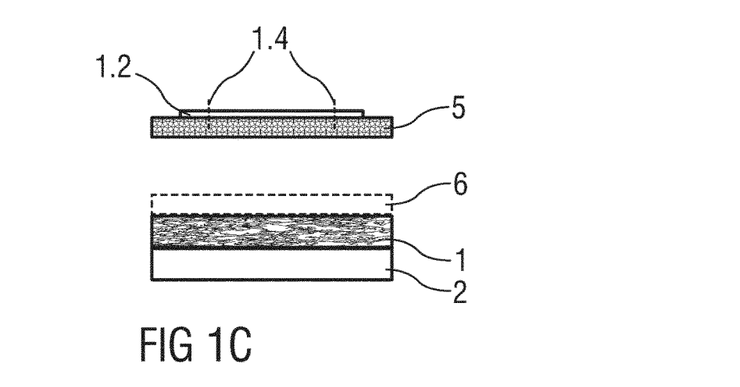
FIG. 1C is a schematic view showing an enlarged detail of another of different exemplary embodiments of a lining and of a cover for an element upholstered in particular in a seam-free manner.
Figure 2A:
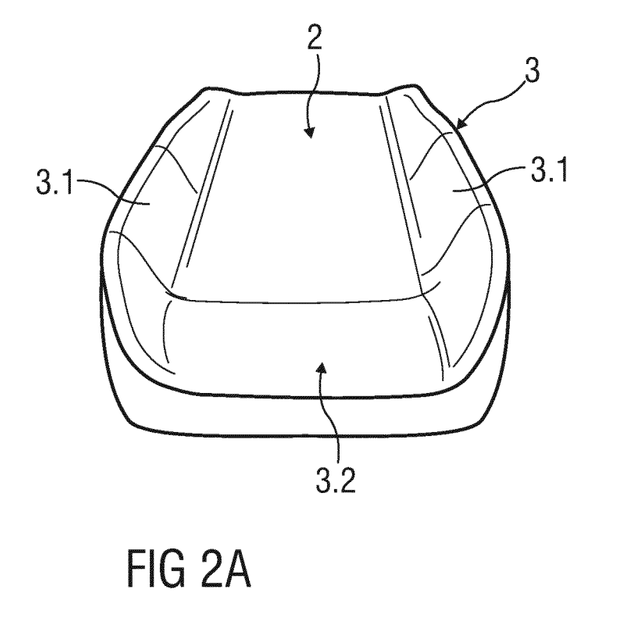
FIG. 2A is a schematic perspective view showing an element upholstered in a seam-free manner.
Figure 2B:
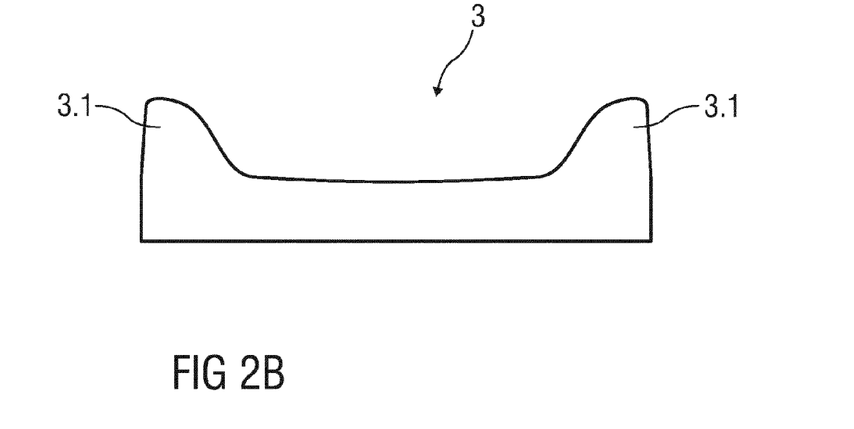
FIG. 2B is a schematic front view showing the element upholstered in a seam-free manner.
Figure 3:
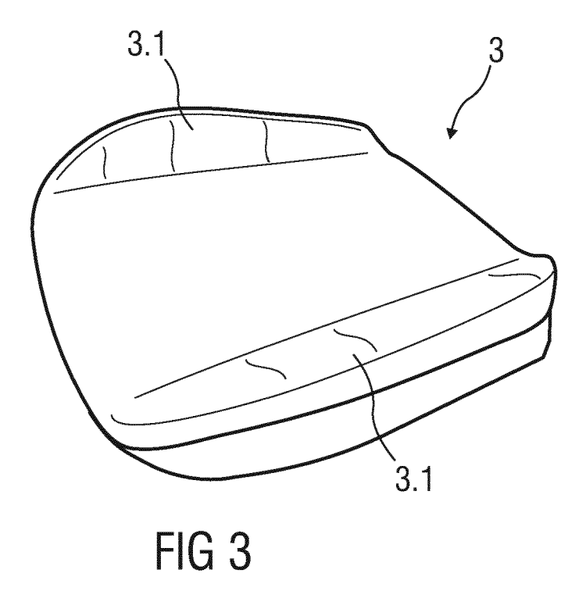
FIG. 3 is a schematic side perspective view showing a further exemplary embodiment of an element upholstered in a seam-free manner.

Referring to the drawings, FIGS. 1A to 1C show an exploded illustration and sectional illustrations of an enlarged detail of different exemplary embodiments of a lining 1 and of a seamless cover 2 for an element 3, in particular an upholstered element 3, illustrated in FIGS. 2A, 2B and 3.

The element 3 can be a vehicle seat, a seat part, a backrest or some other upholstered part. The cover 2 can be formed in particular from a textile, a leather or some other natural material or natural woven fabric. To form a desired outer contour, in particular of optically visible upholstered zones, the element 3 comprises the lining 1, which is provided, at least on one surface side 1.1, with a molding 1.2 corresponding to a desired bulge-free outer contour, and a carrier unit 7, in particular a foam cushion, to form lateral bolsters 3.1 and transverse bolsters 3.2, as illustrated for example in FIGS. 2A to 2D.

The molding 1.2 in the lining 1 can have been introduced or applied for example as a tab, pocket or loop. In the exemplary embodiment according to FIG. 1A, the molding 1.2 is formed on that surface side 1.1 of the lining 1 that faces away from the cover 2.

Alternatively, the molding can be formed on the surface side 1.3 facing the cover 2 or on both surface sides 1.1 and 1.3 in a manner which is not illustrated in more detail.

Two lateral moldings 1.2 have been introduced into the lining 1 according to FIG. 1A, these forming bulge-free lateral bolsters 3.1 for example in the case of an element 3 configured as a vehicle seat or seat part, as illustrated in FIGS. 2A to 3. Alternatively or in addition, bulge-free transverse bolsters 3.2 can be formed, by means of further moldings 1.2 that are not illustrated, in particular on a front edge and/or a rear edge of an element 3 configured as a seat element.

In this case, the element 3 comprises the inner carrier unit 7, which forms the outer contours with lateral bolsters 3.1 and transverse bolsters 3.2 and to which the various outer composites illustrated in FIGS. 1A to 1C are applied.

In the simplest embodiment according to FIG. 1A, an outer composite that is able to be applied to the carrier unit 7 comprises the cover 2 laminated with the lining 1, wherein the lining 1 comprises moldings 1.2 on the surface side 1.1 facing away from the cover 2, at least in sections, in particular in the region of lateral bolsters 3.1 and/or transverse bolsters 3.2. In this exemplary embodiment, the moldings 1.2 are secured directly to the lining 1, for example by means of a seam 1.4. In addition, each particular, for example tab-like molding 1.2 can be provided with a support element 1.5, in particular a wire, a rod or a clip.

In an alternative embodiment according to FIG. 1B, an outer composite that is able to be applied to the carrier unit 7 comprises the cover 2 laminated with the lining 1. In this exemplary embodiment, the moldings 1.2 are secured to a carrier 5 which is in turn applied to the lining 1 with the surface side facing away from the molding 1.2 and is connected to the lining 1 by a material bond. The cover 2 is for example a leather. In the case of leather as the cover 2, the lining 1, for example a nonwoven or a warp-knit, is or has been connected to the cover 2 by a material bond by means of an adhesive 4.

In a further alternative embodiment according to FIG. 1C, an outer composite that is able to be applied to the carrier unit 7 comprises the cover 2 laminated with the lining 1. In this case, the lining 1, for example a thermoplastic material such as a foam film or a textile, is or has been applied directly to the cover 2 formed from a woven fabric by fusing (=flame lamination). The moldings 1.2 are secured to the carrier 5 in this exemplary embodiment. A reinforcing element 6 is additionally arranged on the lining 1 and connected thereto by a material bond. The carrier 5 having the secured moldings 1.2 is applied to the reinforcing element 6 with the surface side facing away from the molding(s) 1.2 and connected to the reinforcing element 6 by a material bond.

According to the different embodiments, the moldings 1.2 are introduced into or applied to the lining 1 or introduced into or applied to the carrier 5 before the lining 1 is connected to the cover 2 or to the carrier 5. The molding 1.2, configured for example as a tab, loop or pocket, can additionally be secured to the lining 1 or carrier 5 by means of a seam 1.4. Alternatively, the molding 1.2 can be adhesively bonded or tacked.

Figure 1D:
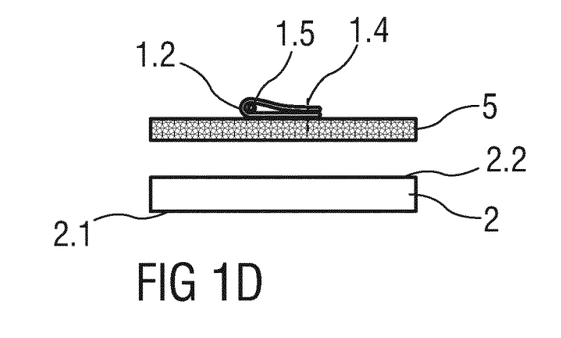
FIG. 1D is a schematic view showing an enlarged detail of an exemplary embodiment of a seamless cover without a lining for an element upholstered in a seam-free manner.

FIG. 1D schematically shows an enlarged detail of a further exemplary embodiment of a seamless cover 2 without a lining for an element 3 upholstered in a seam-free manner. The cover 2 has a surface side 2.1 that forms a seat face and a non-visible surface side 2.2 facing away therefrom. The molding 1.2 can be connected directly or indirectly to the cover 2 by a material bond on the non-visible surface side 2.2 in this exemplary embodiment.

In FIG. 1D, the molding 1.2 is optionally secured to the carrier 5, which is in turn connected to the cover 2 on the non-visible surface side 2.2 thereof by a material bond, in particular adhesively bonded thereto.

In addition, a support element 1.5, in particular a looped tape, a rod, a clip or a wire, can have been introduced into a cavity in the molding 1.2.

In one possible embodiment, the lining 1 is formed from a thermoplastic film. Alternatively, the lining 1 can be formed from a spacer warp-knit, in particular a 3D spacer warp-knit, a nonwoven, a plastics material, a hybrid material, in particular a synthetic fabric, or some other woven or nonwoven material.

The lining 1 with the applied or introduced and optionally additionally secured, in particular sewn, adhesively bonded, tacked or clipped, moldings 1.2 is connected to the cover 2 by a material bond. To this end, an adhesive 4, in particular a laminating adhesive, can have been introduced between the lining 1 and the cover 2. The lining 1 and the cover 2 are subsequently connected together by a material bond in an in particular combined pressing and drying operation under a predetermined pressure and/or at a predetermined temperature. In this case, the adhesive 4 is applied to a rear side 2.1 of the cover 2, in particular the surface side facing the lining 1 and/or to a surface side 1.3, facing the cover 2, of the lining 1.

Subsequently, the cover 2 provided with the lining 1 can have been additionally applied to the carrier unit 7, in particular a cushion carrier or cushion body, of the element 3, in a manner not illustrated, with the outer contour formed for example in a convex and/or concave manner, as a result of the moldings 1.2 of the lining 1 or the moldings 1.2 of the carrier 5, and fastened thereto, for example tacked, stapled or clipped or adhesively bonded. The carrier unit 7 is formed for example from a synthetic molded body or a natural molded body.

FIG. 1B shows the exemplary embodiment with the indirect application of the molding 1.2 to a separate carrier 5. In this case, the molding 1.2 has been secured to the separate carrier 5, in particular secured by means of seams 1.4. The carrier 5 is formed in particular from a cloth material, for example a textile, a woven fabric, a knit or a warp-knit.

In this exemplary embodiment, the cover 2 is prefabricated with the lining 1 and cut to size. Subsequently, the carrier 5 having the secured molding 1.2 is connected to the lining 1, in particular by a material bond, for example adhesively bonded thereto, with the surface side facing away from the molding 1.2.

To this end, the carrier 5 is for example provided with an adhesive. Alternatively, the carrier 5 can have been impregnated with an adhesive.

FIG. 1C shows a further exemplary embodiment with the indirect application of the molding 1.2 to a separate carrier 5, wherein the lining 1 is and has been provided optionally with a reinforcing element 6 on that surface side 1.1 of the lining 1 that faces away from the cover 2. The reinforcing element 6 is configured in particular as a reinforcing fabric, for example a warp-knit, a nonwoven or a knit, and connected to the lining 1 by a material bond, in particular adhesively bonded thereto.

The method for producing the element 3 provided with the seamless cover 2 without a lining 1 to form a concave and/or convex outer contour in this case comprises the following steps in a simple embodiment:

introduction or application of at least one molding 1.2, in particular a textile tab, loop or pocket, into or to the non-visible surface side 2.2 of the cover 2, and securing of the molding 1.2 to the cover 2, and also connection of the secured molding 1.2 to the cover 2 by a material bond.

A further alternative method for producing the element 3 provided with the seamless cover 2 and the lining 1 to form a concave and/or convex outer contour in this case comprises the following steps in a simple embodiment:

connection of a seamless cover 2 to a lining 1;

introduction or application of at least one molding 1.2, in particular a textile tab, loop or pocket, into or to a surface side 1.1, facing away from the cover 2, of the lining 1, and securing of the molding 1.2 to that surface side 1.1 of the lining 1 that faces away from the cover 2, and also connection of the secured molding 1.2 to the cover 2 by a material bond.

Furthermore, in the case of indirect application of the molding 1.2 to the lining 1 of the already laminated cover 2 or to the cover 2 itself, the molding 1.2 can first of all be applied to the carrier 5 and secured, for example sewn or tacked. Subsequently, the carrier 5 having the secured molding 1.2 is applied to the lining 1 of the already laminated cover 2 or to the cover 2 with the surface side facing away from the molding 1.2 and is connected thereto by a material bond, in particular adhesively bonded.

In a further option, the reinforcing element 6 is arranged on that surface side 1.1 of the lining 1 that faces away from the cover 2 or on the non-visible surface side 2.2 of the cover 2 and secured, in particular adhesively bonded. The reinforcing element 6 is for example a knit, a warp-knit or a nonwoven and is adhesively connected to the lining 1.

In the case of a reinforcing element 6, the carrier 5 is then applied to the reinforcing element 6 on the surface side thereof that faces away from the lining 1 or on the non-visible surface side 2.2 of the cover 2.

The lining 1 has in particular a thickness of 1 mm to 10 mm, in particular of more than 3 mm. The optional reinforcing element 6 or the lower material of the lining 1 has a thickness of 0.5 mm to 1.5 mm, in particular of about 1 mm. The carrier 5 has in particular a thickness of 0.5 mm to 1.5 mm, in particular of about 1 mm.

A further embodiment of the production method provides the following steps:

introduction or application of at least one molding 1.2, in particular a textile tab, loop or pocket, into or to a surface side 1.1, facing away from the cover 2, of the lining 1 or into or to the non-visible surface side 2.2 of the cover 2, optional introduction of at least one support element 1.5, in particular a wire, looped tape, limiting band and/or a partition wall into the molding 1.2, in particular into a cavity formed by the molding 1.2, securing of the molding 1.2 to the lining 1 or to the cover 2 for example by means of at least one seam 1.4 or a clip, optionally separately introducing design elements, in particular patterns, decorative stitching, pieces of embroidery, impressions, screen prints, inkjet prints, offset prints, into the cover 2 before the lining 1 and the cover 2 are secured, in particular connected by a material bond, cutting the lining 1 and/or the cover 2 to size, and connecting the cut-to-size lining 1 to the cut-to-size cover 2 with a material bond, with forming of the cover 2 in a true-to-contour and seam-free manner on the shaped, in particular convexly and/or concavely shaped lining 1.

As a result of the separate introduction of design elements into the cover 2 before the laminating operation, the number of cuttings and of manual sewing operations is greatly reduced compared with conventional mechanical securing methods. In addition, patterns can be introduced into the cover 2 beforehand without any misalignment.

In one possible development, at least one impression, a piece of embroidery, a screen print, an inkjet print or an offset print is introduced into the cover 2 at least in the region of the molding 1.2. This introduction of design elements into the cover 2 takes place before the laminating operation.

FIGS. 2A to 2D schematically show perspective illustrations, from the front and in cross section, of an exemplary embodiment of an element 3 upholstered in a seam-free manner, with lateral bolsters 3.1 shaped by correspondingly formed moldings 1.2 in the lining 1. Alternatively or in addition, further moldings 1.2 can have been introduced into the lining 1, which form for example a transverse bolster 3.2 in the outer contour at the front edge or rear edge of the element 3.

Figure 2C:
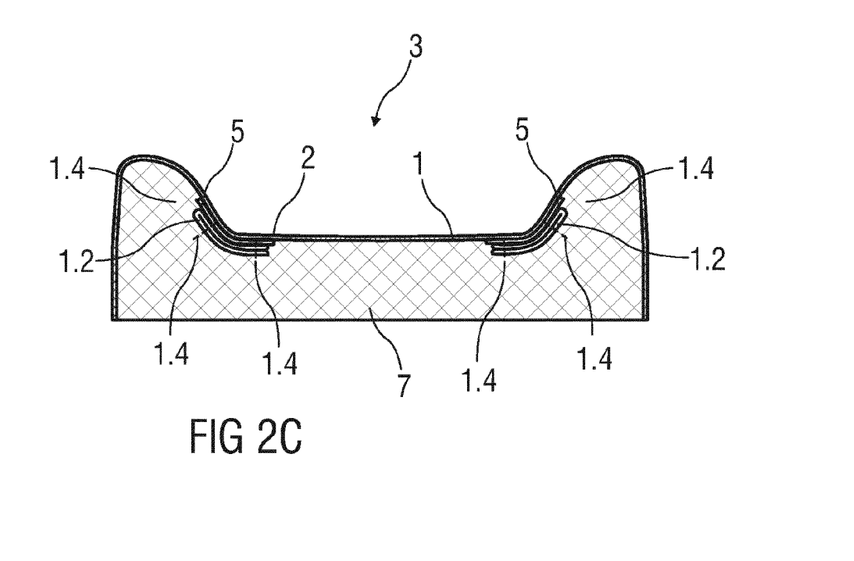
FIG. 2C is a schematic cross sectional view showing the element upholstered in a seam-free manner.
Figure 2D:
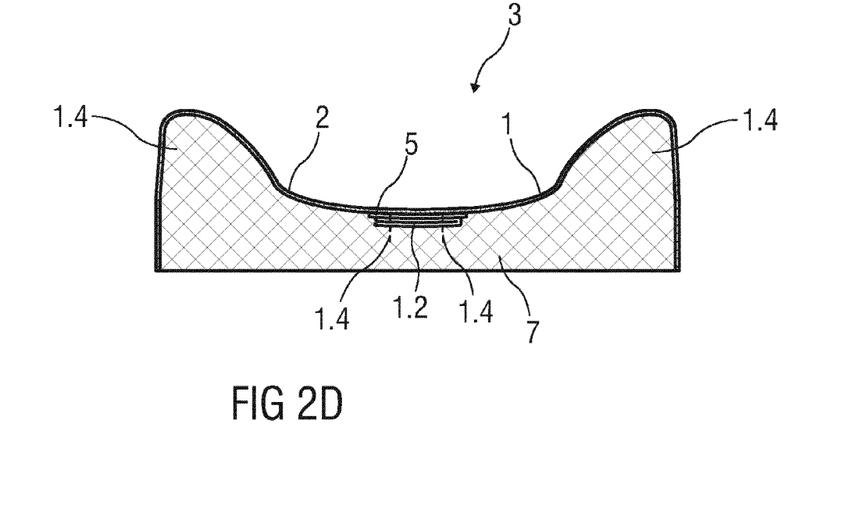
FIG. 2D is a schematic cross sectional view showing the element upholstered in a seam-free manner.

As FIG. 2C shows, the molding(s) 1.2 has or have in this case been arranged on and secured to the lining 1 directly or by means of the carrier 5 only in sections, in particular in concavely shaped regions of the element 3. In the exemplary embodiment according to FIG. 2C, two moldings 1.2 are provided in the transition region to the lateral bolsters 3.1. Furthermore, further moldings 1.2 can be arranged in the central seat-surface region (as illustrated in FIG. 2D) and/or in the region of the transverse bolsters 3.2 (not illustrated). The moldings 1.2 are illustrated by way of example for an element 3 configured as a seat part; however, they can also be provided in corresponding regions in an element 3 configured as a backrest.

FIG. 2D shows an element 3 configured as a seat part having a concavely shaped seat surface. In this case, the molding(s) 1.2 are arranged on and secured to the lining 1 directly or by means of the carrier 5 in sections in the concavely shaped seat region of the element 3. In particular, the moldings 1.2 are arranged at the lowest point of the concavely shaped region.

Figure 2E:
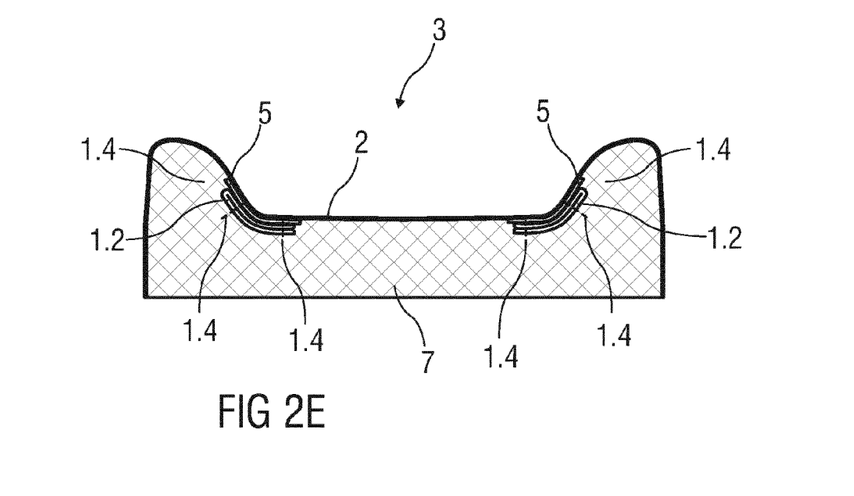
FIG. 2E is a schematic cross sectional view showing the element upholstered in a seam-free manner.

FIG. 2E schematically shows a perspective illustration of an element 3 configured as a seat part, wherein the cover 2 has been formed without a lining. In this exemplary embodiment, the molding(s) 1.2 has or have been secured to the cover 2 in sections on the non-visible surface side 2.2 in the concavely shaped seat regions of the element 3, and connected to the cover 2 by a material bond there. Optionally, the carrier 5 can be arranged between the cover 2 and the molding 1.2. In this case, the molding 1.2 is first of all secured to the carrier 5 and the latter is subsequently connected to the cover 2 by a material bond.

FIG. 3 schematically shows a perspective illustration in side view of a further exemplary embodiment of an element 3 upholstered in a seam-free manner, said element 3 forming a seat part with lateral bolsters 3.1.

While specific embodiments of the invention have been shown and described in detail to illustrate the application of the principles of the invention, it will be understood that the invention may be embodied otherwise without departing from such principles.

The invention claimed is:

1. A method for producing a vehicle seat element provided with a cover, the method comprising the steps of:

applying a molding to a carrier;

applying and securing the carrier to a non-visible surface side facing away from a visible surface side of the cover; and connecting the carrier to the cover by a material bond;

sewing the molding to the carrier before the carrier is connected to the cover by material bond.

2. The method as claimed in claim 1, wherein a tab, pocket or loop is introduced into or applied to a lining of the cover as the molding.

3. The method as claimed in claim 1, wherein the cover being provided with a lining, the molding is applied and secured to a surface side of the lining that faces away from the cover.

4. The method as claimed in claim 1, wherein the molding is applied to a carrier and the carrier is connected to the cover or to a lining of the cover by the material bond.

5. The method as claimed in claim 1, wherein a support element, comprising a looped tape or wire, is introduced into a cavity in the molding.

6. The method as claimed in claim 1, wherein at least one impression, piece of embroidery, screen print, inkjet print or offset print is introduced into the cover at least in the region of the molding.

7. The method as claimed in claim 1, wherein a film, a foam, a nonwoven or a thermoplastic film is used as the lining.

8. The method as claimed in claim 1, wherein a reinforcing element is applied to the non-visible surface side of the cover.

9. The method as claimed in claim 8, wherein:

the molding is applied to a carrier and the carrier is connected to the cover or to a lining of the cover by the material bond; and the carrier provided with the molding is applied to the reinforcing element with the surface side that faces away from the molding.

10. A vehicle seat element provided with a cover arranged on a lining, the element comprising:

a molding applied to a carrier, the carrier applied and secured to a non-visible surface side facing away from a visible surface side of the cover; and a material bond connecting the carrier to the cover, wherein the molding is sewn to the carrier before the carrier is connected to the cover by the material bond.

11. The element as claimed in claim 10, wherein a tab, pocket or loop is introduced into or applied to the lining of the cover as the molding.

12. The element as claimed in claim 10, wherein the molding is secured to a carrier and the carrier is connected to the cover or to the lining by the material bond.

13. The element as claimed in claim 12, wherein the carrier is formed from a cloth material, a textile, a woven fabric, a knit or a warp-knit.

14. The element as claimed in claim 10, wherein the lining of the cover is formed from a synthetic film, a foam, a nonwoven film or a thermoplastic film.

15. The element as claimed in claim 10, wherein a reinforcing element and/or a carrier is/are arranged between the lining of the cover and molding or between the cover and molding.

16. A method for producing a vehicle seat element, the method comprising the steps of:

providing a molding, a carrier and a cover, the cover having a visible surface which is visible when mounted on a vehicle seat, the cover having a non-visible surface diametrically opposite the visible surface;

sewing the molding to the carrier;

applying and securing the carrier to the non-visible surface of the cover by a material bond;

said sewing of the molding to the carrier being performed before the carrier is connected to the cover by the material bond.

* * * * *